United States Patent
Kataoka et al.

(10) Patent No.: US 11,663,731 B2
(45) Date of Patent: May 30, 2023

(54) DETERMINING METHOD, INFORMATION PROCESSING APPARATUS, AND RECORDING MEDIUM

(71) Applicant: FUJITSU LIMITED, Kawasaki (JP)

(72) Inventors: Masahiro Kataoka, Kamakura (JP); Masao Ideuchi, Hachioji (JP); Hitoshi Okumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 17/131,609

(22) Filed: Dec. 22, 2020

(65) Prior Publication Data

US 2021/0110559 A1 Apr. 15, 2021

Related U.S. Application Data

(63) Continuation of application No. PCT/JP2018/025415, filed on Jul. 4, 2018.

(51) Int. Cl.
| | | |
|---|---|---|
| G06T 7/564 | (2017.01) | |
| G06T 7/246 | (2017.01) | |
| G06T 7/73 | (2017.01) | |
| G06T 7/13 | (2017.01) | |

(Continued)

(52) U.S. Cl.
CPC ............ *G06T 7/564* (2017.01); *G06T 7/13* (2017.01); *G06T 7/246* (2017.01); *G06T 7/73* (2017.01); *G06V 20/20* (2022.01); *G06V 20/35* (2022.01)

(58) Field of Classification Search
CPC .......... G06T 7/564; G06T 7/246; G06T 7/73; G06T 7/13; G06V 20/35; G06V 20/20
See application file for complete search history.

(56) References Cited

U.S. PATENT DOCUMENTS 8,094,881 B2   1/2012 Matsugu et al.
9,471,171 B2 *  10/2016 Niinuma ............... G06F 3/0416
(Continued)

FOREIGN PATENT DOCUMENTS

JP   2005-202653 A   7/2005
JP   2008-128867 A   6/2008
(Continued)

OTHER PUBLICATIONS

Australia Office Action dated Aug. 11, 2021 for corresponding Australia Patent Application No. 2018430831, with English Translation, 3 pages. *Please note D1 cited herewith, were previously cited in an IDS filed on May 11, 2021.*

(Continued)

*Primary Examiner* — Shefali D Goradia
(74) *Attorney, Agent, or Firm* — Fujitsu Patent Center

(57) ABSTRACT

A determining method includes acquiring first direction information, when a first captured image captured by an imaging device is acquired, by referring to a storage storing a plurality of pieces of direction information indicating a plurality of directions associating with respective shapes of a plurality of contours of an object according to a plurality of directions of the object, the first direction information associated with a shape of a contour that corresponds to a shape of a contour of the subject included in the acquired first captured image among the shapes of the contours, and acquiring second direction information, when a second captured image newly captured by the imaging device is acquired, by referring to the storage to acquire second direction information associated with a shape of a contour that corresponds to a contour of the subject included in acquired second captured image among the shapes of contours.

14 Claims, 11 Drawing Sheets

(51) Int. Cl.
*G06V 20/20* (2022.01)
*G06V 20/00* (2022.01)

(56) References Cited

U.S. PATENT DOCUMENTS

| | | | |
|---|---|---|---|
| 2002/0106135 A1 | 8/2002 | Iwane | |
| 2015/0085179 A1* | 3/2015 | Van Heugten | G02B 7/38 |
| | | | 348/349 |
| 2020/0004326 A1* | 1/2020 | Sipolins | G06T 19/006 |
| 2020/0031283 A1* | 1/2020 | Nakasho | B60R 1/002 |

FOREIGN PATENT DOCUMENTS

| | | | |
|---|---|---|---|
| JP | 2010-102595 A | 5/2010 |
| JP | 2011-129082 A | 6/2011 |
| JP | 2014-029664 A | 2/2014 |

OTHER PUBLICATIONS

International Search Report and Written Opinion of the International Searching Authority (Form PCT/ISA/210, 220, and 237), mailed in connection with PCT/JP2018/025415 and dated Oct. 2, 2018 (12 pages).
European Search Report dated Apr. 30, 2021 for corresponding European Patent Application No. 18925624.1, 8 pages.
Weinland, Daniel et al., "A Survey of Vision-Based Methods for Action Representation, Segmentation and Recognition", Inria, Rapport de Recherche, Feb. 1, 2010, XP055053775, Retrieved from the Internet: URL: http://hal.inria.fr/docs/00/45/96/53/PDF/RR-7212. pdf [Retrieved on Feb. 18, 2013], pp. 1-54.
European Office Action dated Mar. 24, 2023 for corresponding European Patent Application No. 18925624.1, 5 pages.

* cited by examiner

FIG.2
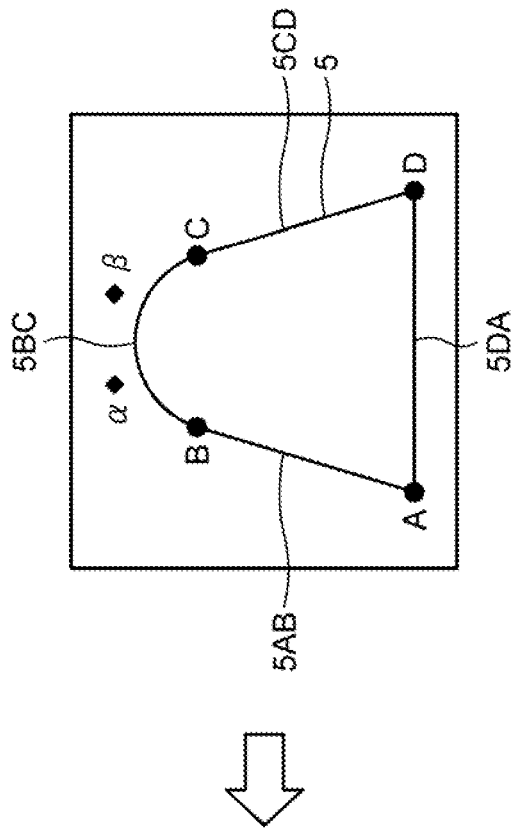
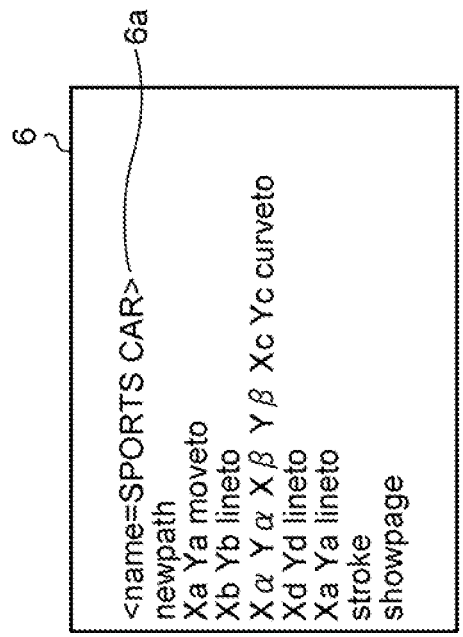

FIG.5

| IDENTIFICATION INFORMATION | 0°/0:00 | 30°/1:00 | 45°/1:30 | 60°/3:00 | ⋮ |
|---|---|---|---|---|---|
| C001 | PostScript DATA CORRESPONDING TO 0° OF IDENTIFICATION INFORMATION "C001" | PostScript DATA CORRESPONDING TO 30° OF IDENTIFICATION INFORMATION "C001" | PostScript DATA CORRESPONDING TO 45° OF IDENTIFICATION INFORMATION "C001" | PostScript DATA CORRESPONDING TO 60° OF IDENTIFICATION INFORMATION "C001" | ⋮ |
| C002 | PostScript DATA CORRESPONDING TO 0° OF IDENTIFICATION INFORMATION "C002" | PostScript DATA CORRESPONDING TO 30° OF IDENTIFICATION INFORMATION "C002" | PostScript DATA CORRESPONDING TO 45° OF IDENTIFICATION INFORMATION "C002" | PostScript DATA CORRESPONDING TO 60° OF IDENTIFICATION INFORMATION "C002" | ⋮ |
| C003 | PostScript DATA CORRESPONDING TO 0° OF IDENTIFICATION INFORMATION "C003" | PostScript DATA CORRESPONDING TO 30° OF IDENTIFICATION INFORMATION "C003" | PostScript DATA CORRESPONDING TO 45° OF IDENTIFICATION INFORMATION "C003" | PostScript DATA CORRESPONDING TO 60° OF IDENTIFICATION INFORMATION "C003" | ⋮ |
| ⋮ | ⋮ | ⋮ | ⋮ | ⋮ | ⋮ |

| TIME | IDENTIFICATION INFORMATION | DIRECTION INFORMATION | ATTRIBUTE INFORMATION | IMAGE INFORMATION |
|---|---|---|---|---|
| $t_1$ | C001 | 0° | RESPECTIVE TEXT INFORMATION INCLUDED IN PostScript DATA CORRESPONDING TO DIRECTION INFORMATION "0°" OF IDENTIFICATION INFORMATION "C001" | IMAGE INFORMATION OF RESPECTIVE PARTS AT TIME $t_1$ |
| $t_2$ | C001 | 0° | RESPECTIVE TEXT INFORMATION INCLUDED IN PostScript DATA CORRESPONDING TO DIRECTION INFORMATION "0°" OF IDENTIFICATION INFORMATION "C001" | IMAGE INFORMATION OF RESPECTIVE PARTS AT TIME $t_2$ |
| $t_3$ | C001 | 30° | RESPECTIVE TEXT INFORMATION INCLUDED IN PostScript DATA CORRESPONDING TO DIRECTION INFORMATION "30°" OF IDENTIFICATION INFORMATION "C001" | IMAGE INFORMATION OF RESPECTIVE PARTS AT TIME $t_3$ |
| $t_4$ | C001 | 45° | RESPECTIVE TEXT INFORMATION INCLUDED IN PostScript DATA CORRESPONDING TO DIRECTION INFORMATION "45°" OF IDENTIFICATION INFORMATION "C001" | IMAGE INFORMATION OF RESPECTIVE PARTS AT TIME $t_4$ |
| $t_5$ | C001 | 60° | RESPECTIVE TEXT INFORMATION INCLUDED IN PostScript DATA CORRESPONDING TO DIRECTION INFORMATION "60°" OF IDENTIFICATION INFORMATION "C001" | IMAGE INFORMATION OF RESPECTIVE PARTS AT TIME $t_5$ |
| ⋮ | ⋮ | ⋮ | ⋮ | ⋮ |

| ANGLE TRANSITION PATTERN | ACTION TYPE |
|---|---|
| NO CHANGE IN ANGLE FOR PREDETERMINE PERIOD | STOP |
| ANGLE CHANGES IN RIGHT-HANDED ROTATION | RIGHT TURN |
| ANGLE CHANGES IN LEFT-HANDED ROTATION | LEFT TURN |
| ... | ... |

FIG.9

| PART NAME | IMAGE PATTERN | EVENT |
|---|---|---|
| HEAD LAMP | BRIGHTNESS IS BEING EQUAL TO OR HIGHER THAN THRESHOLD CONTINUOUSLY FOR PREDETERMINED PERIOD | LAMP IS TURNED ON |
| HEAD LAMP | BRIGHTNESS IS BEING LOWER THAN THRESHOLD CONTINUOUSLY FOR PREDETERMINED PERIOD | LAMP IS TURNED OFF |
| RIGHT DIRECTION INDICATOR | BRIGHTNESS REPEATS BEING EQUAL TO OR HIGHER THAN THRESHOLD AND BEING LOWER THAN THRESHOLD EVERY PREDETERMINED PERIOD | RIGHT DIRECTION INDICATOR IS FLASHING |
| LEFT DIRECTION INDICATOR | BRIGHTNESS REPEATS BEING EQUAL TO OR HIGHER THAN THRESHOLD AND BEING LOWER THAN THRESHOLD EVERY PREDETERMINED PERIOD | LEFT DIRECTION INDICATOR IS FLASHING |
| STOP LAMP | BRIGHTNESS IS EQUAL TO OR HIGHER THAN THRESHOLD | BRAKE |
| ... | ... | ... |

DETERMINING METHOD, INFORMATION PROCESSING APPARATUS, AND RECORDING MEDIUM

CROSS-REFERENCE TO RELATED APPLICATION

This application is a continuation application of International Application PCT/JP2018/025415, filed on Jul. 4, 2018, and designating the U.S., the entire contents of which are incorporated herein by reference.

FIELD

The present invention relates to a determining method, and the like.

BACKGROUND

Conventionally, there have been various kinds of techniques in which an object is imaged by a camera, and its action pattern is detected based on a movement of the object. For example, among conventional techniques, there is one in which a shape model is applied to an image of a subject, chronological data of representative positions is extracted in a part unit, and comparison between the extracted chronological data and model data is performed, thereby identifying an action category. Moreover, as a conventional technique of detecting a behavioral pattern of a person from an image, there has been one in which a probability model of a standard behavior is automatically trained by using a hidden Markov model (HMM).

Patent Document 1: Japanese Laid-open Patent Publication No. 2010-102595
Patent Document 2: Japanese Laid-open Patent Publication No. 2005-202653

SUMMARY

According to an aspect of the embodiments, a determining method includes: acquiring first direction information, when a first captured image captured by an imaging device is acquired, by referring to a storage unit storing a plurality of pieces of direction information indicating a plurality of directions associating with respective shapes of a plurality of contours of an object according to a plurality of directions of the object, the first direction information associated with a shape of a contour that corresponds to a shape of a contour of the subject included in the acquired first captured image among the shapes of the contours; acquiring second direction information, when a second captured image newly captured by the imaging device is acquired, by referring to the storage unit to acquire second direction information associated with a shape of a contour that corresponds to a contour of the subject included in acquired second captured image among the shapes of contours; and performing determination about a movement of the subject based on a relationship between the acquired first direction information and second direction information, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram for explaining a relationship between an outline and PostScript data;

FIG. 5 is a diagram illustrating an example of a data structure of an outline HMM according to the present embodiment;

FIG. 7 is a diagram illustrating an example of a data structure of an intermediate-data accumulation table according to the present embodiment;

FIG. 8 is a diagram illustrating an example of a data structure of an action determination table according to the present embodiment;

FIG. 9 is a diagram illustrating an example of a data structure of an event determination table according to the present embodiment;

DESCRIPTION OF EMBODIMENTS

However, in the conventional technique described above, there is a problem that determination about a movement of a subject or a state of one part of the subject included in a captured image is not performed easily.

For example, because edges extracted from an image include edges of various shapes, it is difficult to apply a specific shape model to the image of the subject, and is not easy to determine an action category.

In one aspect, it is an object of the embodiments to provide a determining method, a determining program, and an information processing apparatus that enable to reduce determination time for a movement of a subject or a state of one part of the subject included in a captured image.

Hereinafter, an embodiment of a determining method, a determining program, and an information processing apparatus according to the present invention will be explained in detail with reference to the drawings.

EMBODIMENT

Figure 1:
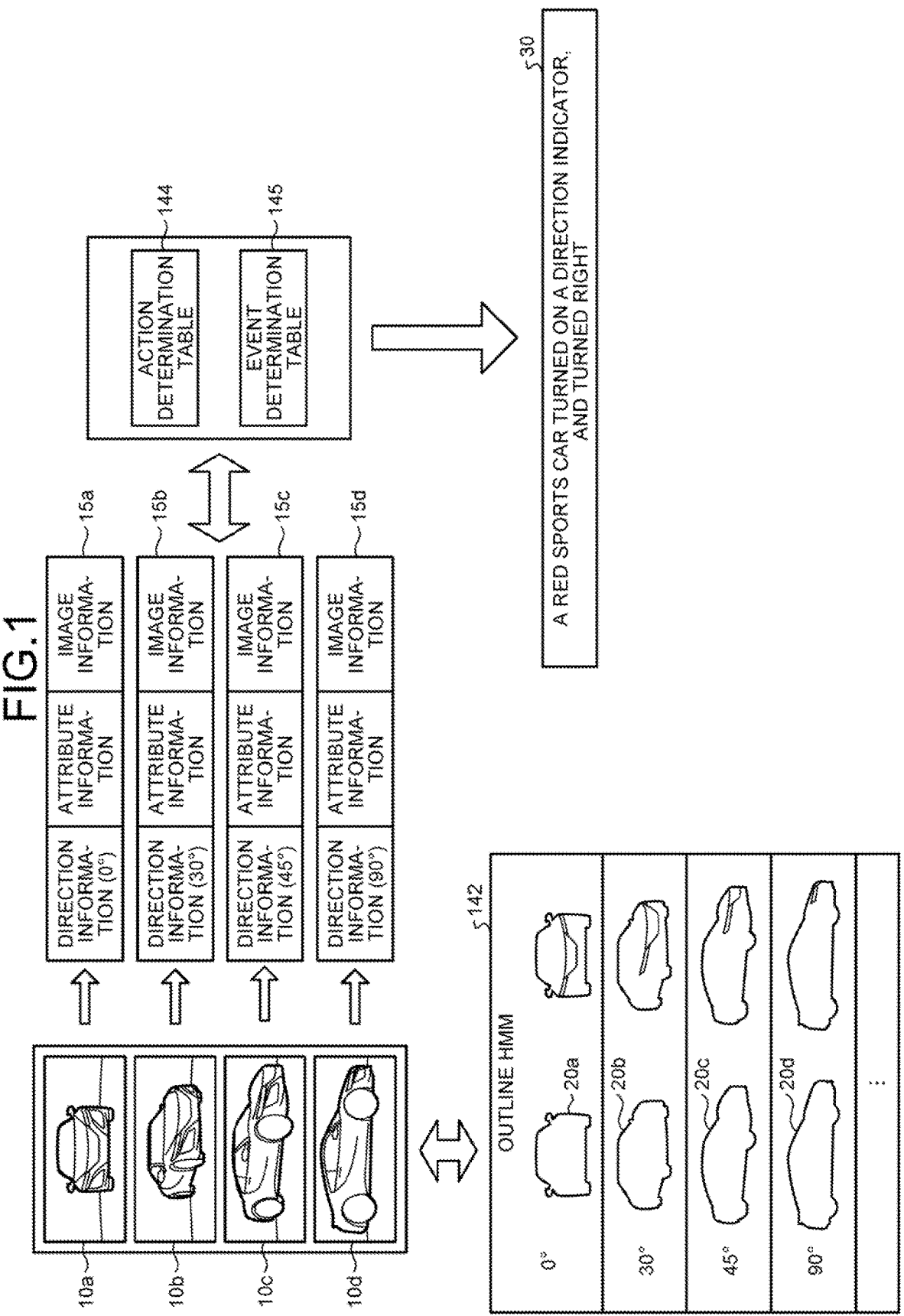
FIG. 1 is a diagram for explaining an example of processing performed by an information processing apparatus according to the present embodiment.

FIG. 1 is a diagram for explaining an example of processing performed by the information processing apparatus according to the present embodiment. The information processing apparatus sequentially acquires plural pieces of captured image data 10a, 10b, 10c, 10d from a camera. In the following explanation, the captured image data 10a to 10d are collectively denoted as "captured image data 10" as appropriate.

The information processing apparatus generates intermediate data 15a to 15d for each of the captured image data 10 by comparing the captured image data 10 with an outline HMM 142. The intermediate data 15a is data that is generated from the captured image data 10a. The intermediate data 15b is data that is generated from the captured image data 10b. The intermediate data 15c is data that is generated from the captured image data 10c. The intermediate data 15d is data that is generated from the captured image data 10d. In the following explanation, the intermediate data 15a to 15d are collectively denoted as "intermediate data 15" as appropriate.

The intermediate data 15 includes direction information, attribute information, and image information. The direction information indicates information about a direction of a subject. The attribute information is text information in which explanation about the subject is described. The image information is image information of respective parts included in the subject. The respective parts included in the subject correspond to a headlamp, a direction indicator, a hood, and the like.

The outline HMM 142 includes direction information of an object, and information of a shape of a contour of an object (entirety) and respective parts of an object. The information of parts includes information about a shape, a position, and the like of each part included in a shape of a contour of the object. In the following explanation, a shape of a contour of an object is denoted as "outline".

The information of an outline and a part (shape) is expressed by PostScript data. FIG. 2 is a diagram for explaining a relationship between an outline and the PostScript data. In FIG. 2, as an example, PostScript data 6 corresponding to an outline 5 is indicated. Prom the PostScript data 6, the outline 5 can be drawn.

The outline 5 is constituted of a straight line 5AB, a curve 5BC, a straight line SCD, and a straight line SDA. The straight line 5AB is a straight line connecting a control point A and a control point B. The straight line 5CD is a straight line connecting a control point C and a control point D. The straight line SDA is a straight line connecting the control point D and the control point A. The curve 5BC is a curve connecting the control point B and the control point C, and a shape of the curve is determined by control points α, β, and the control points (end points) B, C.

The PostScript data 6 of the outline 5 is generated based on the control points A, B, C, D and the control points α, β of the outline 5. "Xa, Ya" included in the PostScript data 6 indicate coordinates of the control point A. "Xb, Yb" indicate coordinates of the control point B. "Xc, Yc" indicate coordinates of the control point C. "Xd, Yd" indicate coordinates of the control point D. "Xα, Yα" indicate coordinates of the control point α. "Xβ, Yβ" indicate coordinates of the control point β. The PostScript data 6 includes various kinds of commands "newpath moveto lineto curveto stroke showpage".

Moreover, in the PostScript data 6, an attribute information area 6a in which the attribute information is stored is set. In the attribute information area 6a, text information explaining an object drawn in the PostScript data 6 or a part of the object is stored in advance. For example, a shape of a contour drawn by the PostScript data is a shape of a contour of a sports car, text information indicating "sports car" is stored in the attribute information area 6a. When a shape of a contour drawn by the PostScript data is a shape of a contour of a right direction indicator of a sports car, text information indicating "right direction indicator" is stored in the attribute information area 6a.

Subsequently, processing in which the information processing apparatus compares the captured image data 10a and the outline HMM 142, to generate the intermediate data 15a will be explained. The information processing apparatus extracts a shape of an outer shape (contour) of a subject from the captured image data 10a, and identifies an outline 20a that hits for the extracted shape of the outer shape. The information processing apparatus acquires direction information (0°/0:00), attribute information, and mage information corresponding to the hit outline 20a. The outline HMM 142 includes an outline 20b corresponding to direction information (30°/1:00), an outline 20c corresponding to direction information (45°/1:30), an outline 20d corresponding to direction information (90°/3:00), and the like.

The information processing apparatus acquires text information that is stored in the attribute information area of PostScript data corresponding to the outline 20a, and text information that is stored in the attribute information area of PostScript Data corresponding to an edge of a part as the attribute information.

The information processing apparatus identifies an image area corresponding to an edge of a part as the image information, and acquires partial image information of the identified image area.

The information processing apparatus generates the intermediate data 15b to 15d by performing the processing described above also for the captured image data 10b to 10d.

Subsequently, the information processing apparatus generates sentence information 30 based on the intermediate data 15a to 15d, an action determination table 144, and an event determination table 145.

The action determination table 144 is a table that is used when determination about a movement of a subject is performed. The action determination table 144 associates a transition pattern of angle and a type of an action with each other. The information processing apparatus compares the intermediate data 15a to 15d with the action determination table 144, to determine a type of an action of the subject. For example, the direction information (angle) of the intermediate data 15a to 15d has changed in a right-handed rotation, the type of the action of the subject is "right turn".

The event determination table 145 is a table that is used when an event that occurs in the subject is determined. The event determination table 145 associates a pattern of change of the image information in a certain period and an event with each other. The information processing apparatus compares the intermediate data 15a to 15d with the event determination table 145, to determine an event. For example, a brightness of image information of a right direction indicator included in the image information of the intermediate data 15 becomes equal to or higher than a threshold, and lower than the threshold every certain period, the event is "right direction indicator is lit".

The information processing apparatus generates sentence information 30 by setting the type of action determined by using the action determination table 144 and the event determined by using the event determination table 145 to a predetermined template.

As described above, the information processing apparatus according to the present embodiment compares the outline HMM 142 and a contour shape of a subject in the captured image data 10, to identify a transition of direction of the subject, and performs determination about a movement of the subject. Thus, it becomes unnecessary to use a complicated algorithm when determining a movement or a state of a part of a subject and, therefore, determination time for a movement of the subject included in a captured image data can be reduced.

The information processing apparatus extracts the outline HMM 142 and partial image information of a subject of the captured image data 10, and determines an event by comparing a transition of the partial image information and the event determination table 145. Thus, determination about a state of one part of the subject can be performed easily.

The information processing apparatus generates the sentence information 30 based on the intermediate data 15, the action determination table 144, and the event determination table 145. Thus, the determination about a movement of the subject and a determination result of an event can be recorded or displayed by the sentence information.

Figure 3:
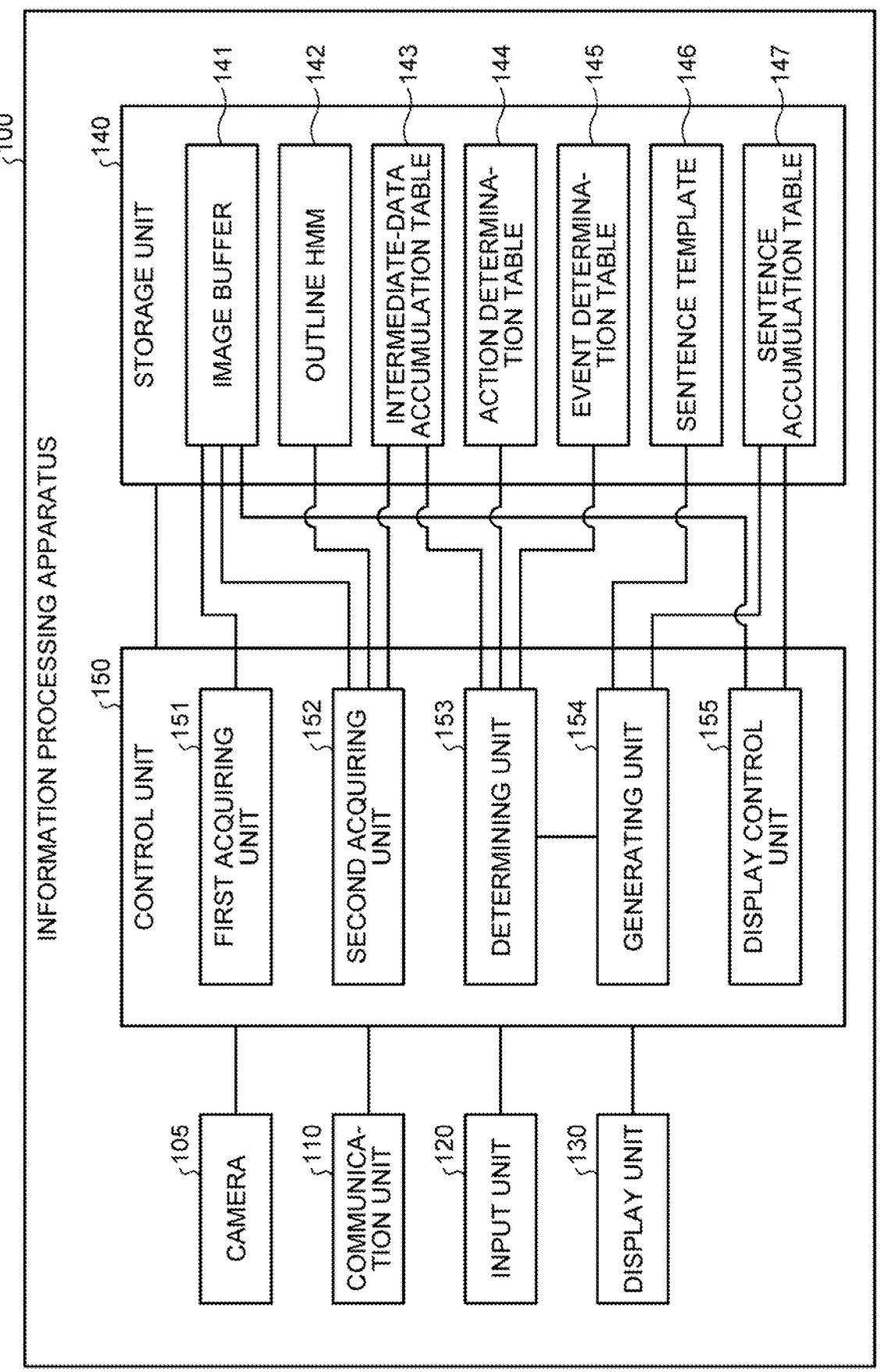
FIG. 3 is a functional block diagram illustrating a configuration of the information processing apparatus according to the present embodiment.

Next, an example of a configuration of the information processing apparatus according to the present embodiment will be explained. FIG. 3 is a functional block diagram illustrating a configuration of the information processing apparatus according to the present embodiment. As illustrated in FIG. 3, this information processing apparatus 100 includes a camera 105, a communication unit 110, an input unit 120, a display unit 130, a storage unit 140, and a control unit 150.

The camera 105 is a stereo camera (binocular camera) that images a subject from two different directions, or a monocular camera that is movable in left and right directions, and is capable of identifying an outline of a subject by parallax. The camera 105 outputs first captured image data that is imaged from a first direction, and second captured image data that is imaged from a second direction different from the first direction to the information processing apparatus 100. In the following explanation, the first captured image data and the second captured image data are collectively denoted as "captured image data" as appropriate.

The communication unit 110 is a processing unit that performs data communication with an external device through a network. The communication unit 110 is an example of a communication device. The communication unit 110 may be connected to the camera 105 through a network, and may receive captured image data through the network.

The input unit 120 is an input device to input various kinds of information to the information processing apparatus 100. For example, the input unit 120 corresponds to a keyboard, a mouse, a touch panel, and the like.

The display unit 130 is a display device to display various kinds of information output from the control unit 150. For example, the display unit 130 corresponds to a liquid crystal display, a touch panel, and the like.

The storage unit 140 includes an image buffer 141, an outline HMM 142, and an intermediate-data accumulation table 143. The storage unit 140 includes the action determination table 144, the event determination table 145, a sentence template 146, and a sentence accumulation table 147. The storage unit 140 corresponds to a semiconductor memory device, such as a random access memory (RAM), a read only memory (ROM), a flash memory, and a storage device, such as a hard disk drive (HDD).

Figure 4:
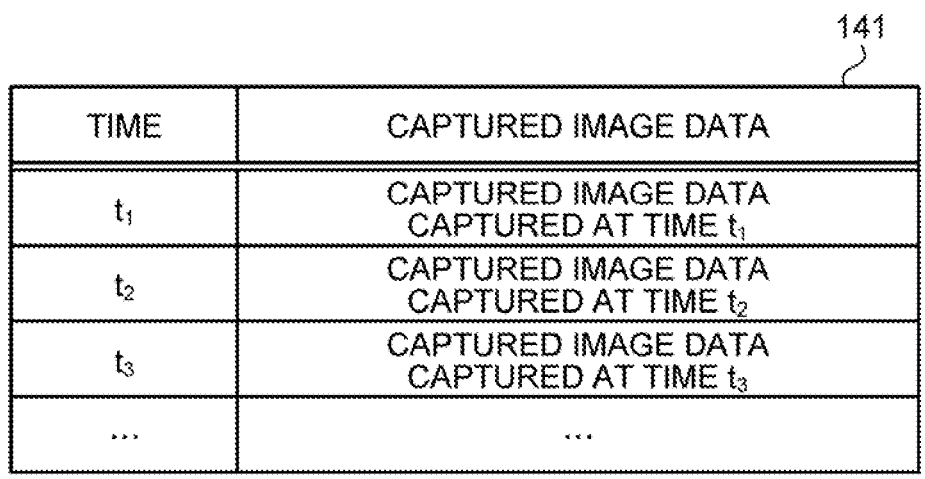
FIG. 4 is a diagram illustrating an example of a data structure of an image buffer according to the present embodiment.

The image buffer 141 is a buffer that stores the captured image data imaged by the camera 105. FIG. 4 is a diagram illustrating an example of a data structure of the image buffer according to the present embodiment. As illustrated in FIG. 4, the image buffer 141 associates a time and captured image data with each other. The time is a time when the captured image data is imaged. The captured image data is image data imaged by the camera 105.

The outline HMM 142 is information holding direction information of an object, and information of an outline of the object and respective parts included in the object. FIG. 5 is a diagram illustrating an example of a data structure of the outline HMM according to the present embodiment. As illustrated in FIG. 5, the outline HMM 142 includes identification information, and PostScript data of each angle (direction of an object expressed in a time expression). The identification information is information to uniquely identify an object. The identification information may be a number that identifies each record of the outline HMM 142.

Figure 6:
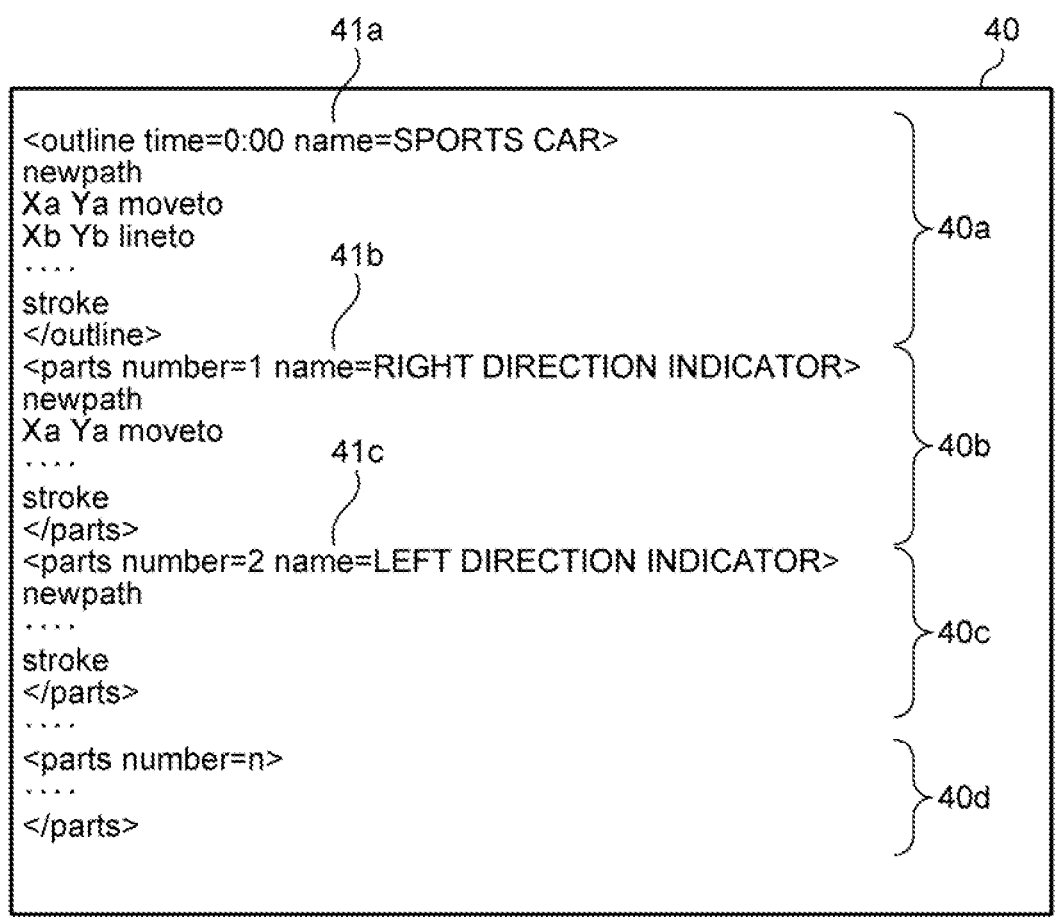
FIG. 6 is a diagram illustrating an example of PostScript data corresponding to one identification information and one angle.

The PostScript data is PostScript data to draw an outline. FIG. 6 is a diagram illustrating an example of PostScript data corresponding to one identification information and one angle. This PostScript data 40 includes plural pieces of PostScript data 40*a*, 40*b*, 40*c*, 40*d*. In FIG. 6, the PostScript data 40*a* to 40*d* are illustrated as an example, but the PostScript data 40 may include other PostScript data.

The highest layer PostScript data 40*a* is PostScript data to draw an outline of a contour of an object (entirety). For example, when the PostScript data 40 is PostScript data of an angle "0°/0:00" of one identification information, an outline of a contour of the object (entirety) corresponds to the outline 20*a* explained in FIG. 1. The PostScript data 40*a* includes attribute information area 41*a*. In this attribute information area 41*a*, text information "sports car" is stored.

The respective PostScript data 40*b* to 40*d* under the PostScript data 40*a* are PostScript data to draw an edge of each part included in the contour of the object. For example, PostScript data 40*b* is PostScript data to draw an edge of a right direction indicator of the object. The PostScript data 40*b* includes attribute information area 41*b*. In this attribute information area 41*b*, text information "right direction indicator" is stored.

The PostScript data 40*c* is PostScript data to draw an edge of a left direction indicator of the object. The PostScript data 40*c* includes attribute information area 41*c*. In this attribute information area 41*c*, text information "left direction indicator" is stored.

The PostScript data 40*d* is PostScript data to draw an edge of another part in the contour of the object. Although illustration is omitted, also in attribute information area of the PostScript data 40*d*, text information to explain the part is included.

The intermediate-data accumulation table 143 is a table in which the intermediate data 15 is accumulated. FIG. 7 is a diagram illustrating an example of a data structure of the intermediate-data accumulation table according to the present embodiment. As illustrated in FIG. 7, this intermediate-data accumulation table 143 associates a time, identification information, direction information, attribute information, and image information with one another. The time indicates a capture time of captured image data. The identification information is information to uniquely identify a subject. The direction information is information indicating a direction of the subject.

The attribute information is text information that is stored in the respective attribute information areas of the respective PostScript data hit for an outline of the captured image data. The image information is partial image information of the respective parts of the respective times. For example, the partial image information of the respective parts includes image information of the hood of the subject, image information of the right direction indicator of the subject, image information of the left direction indicator of the subject, and the like.

The action determination table 144 is a table that is used when determination about a movement of the subject is performed. FIG. 8 is a diagram illustrating an example of a data structure of the action determination table according to the present embodiment. As illustrated in FIG. 8, the action determination table 144 associates an angle transition pattern and an action type with each other.

When the angle pattern is "no change in angle for predetermined period", the action type is "stop". When the angle transition pattern is "angle changes in right-handed rotation", the action type is "right turn". For example, a change of the angle as "0°, 30°, 45°, . . . " is a change in a right-handed rotation. When the angle transition pattern is "angle changes in left-handed rotation", the action type is "left turn". A change of the angle as " . . . 90°, 60°, 45°, . . . " is a change in a left-handed rotation.

The event determination table 145 is a table used when an event that occurs in the subject is determined. FIG. 9 is a diagram illustrating an example of a data structure of the event determination table according to the present embodiment. As illustrated in FIG. 9, the event determination table associates a part name, an image pattern, and an event with one another. The part name is a name to identify a part of the subject. The image pattern indicates a pattern of change of partial image information corresponding to the part. The event indicates an event occurring in the subject.

For example, when the image pattern corresponding to the part name "head lamp" is "brightness is equal to or higher than threshold continuously for predetermined period", it is entered that the event is "lamp is turned on". When the image pattern corresponding to the part name "head lamp" is "brightness is lower than threshold continuously for predetermined period", it is entered that the event is "light is turned off".

The image pattern corresponding to the part name "right direction indicator" is "brightness repeats being equal to or higher than threshold and being lower than threshold every predetermined period", it is entered that the event is "right direction indicator is turned on". When the image pattern corresponding to the part name "left direction indicator" is "brightness repeats being equal to or higher than threshold and being lower than threshold every predetermined period", it is entered that "left direction indicator is turned on".

When the image pattern corresponding to the part name "stop lamp" is "brightness is equal to or higher than threshold", it is entered that the event is "brake".

The sentence template 146 holds various kinds of templates to generate sentence information. For example, by incorporating the text information of a type of an action determined based on the action determination table 144 and the text information of an event determined based on the event determination table 145 in a template, the sentence information is generated.

The sentence accumulation table 147 is a table in which sentence information that is generated by the control unit 150 described later is accumulated.

The control unit 150 includes a first acquiring unit 151, a second acquiring unit 152, a determining unit 153, a generating unit 154, and a display control unit 155. The first acquiring unit 151 and the second acquiring unit 152 are an example of an acquiring unit. The control unit 150 can be implemented by a central processing unit (CPU), a micro processing unit (MPU), or the like. Moreover, the control unit 150 can also be implemented by hard wired logic, such as an application specific integrated circuit (ASIC) and a field programmable gate array (FPGA).

The first acquiring unit 151 is a processing unit that acquires captured image data from the camera 105. The first acquiring unit 151 stores the acquired captured image data in the image buffer 141, associating with a time. The camera 105 may add time information to the captured image data at the time of imaging, or the first acquiring unit 151 may acquire information of a time from a timer not illustrated.

The second acquiring unit 152 is a processing unit that generates intermediate data based on the captured image data stored in the image buffer 141 and the outline HMM 142, and stores the generated intermediate data in the intermediate-data accumulation table 143. In the following, an example of processing performed by the second acquiring unit 152 will be explained.

The second acquiring unit 152 extracts a contour shape of a subject in a captured image based on the captured image data (the first captured-image data and the second captured-image data) by a principle of a stereo camera. The second acquiring unit 152 identifies the contour shape as an outline of the subject. In the following explanation, an outline of a subject extracted from captured image data is denoted as "image outline".

The second acquiring unit 152 respectively draws an outline of a contour of the subject (entirety) based on PostScript data of the highest layer for each PostScript data of the outline HMM 142. The second acquiring unit 152 compares the respective drawn outlines with the image outline, to calculate similarities, and determines a set of an outline and an image outline the similarity of which is highest (or equal to or higher than a predetermined similarity).

The second acquiring unit 152 may calculate a similarity between the respective outlines drawn based on the respective PostScript data and the image outline by any method. For example, the second acquiring unit 152 may calculate a concordance rate between an area surrounded by the outline and an area surrounded by the image outline, as the similarity. In the following explanation, PostScript data used to draw an outline with which the similarity to the image outline is maximized is denoted as "relevant PostScript data".

Processing of identifying the direction information of the intermediate data performed by the second acquiring unit 152 will be explained. The second acquiring unit 152 identifies direction information of the subject based on a position of relevant PostScript data stored in the outline HMM 142. For example, when the relevant PostScript data is PostScript data on a first row and a first line out of the respective PostScript data of the outline HMM 142 illustrated in FIG. 5, the direction information is "0°/0:00". The second acquiring unit 152 stores the identified direction information in the intermediate data.

Processing of extracting attribute information of intermediate data performed by the second acquiring unit 152 will be explained. The second acquiring unit 152 acquires text information stored in the attribute information area of respective layers of the relevant PostScript data, and stores the acquired text information in the intermediate data. For example, the relevant PostScript data is PostScript data 40 illustrated in FIG. 6, "sports car", "right direction indicator", and "left direction indicator" are extracted. The second acquiring unit 152 adds information indicating whether the respective extracted text information are text information of the PostScript data of the outline of the subject, or text information of PostScript data of a part, to respective text information.

Processing of extracting image information of intermediate data performed by the second acquiring unit 152 will be explained. The second acquiring unit 152 refers to PostScript data of a part included in the relevant PostScript data, and identifies areas of respective parts in the captured image data. The second acquiring unit 152 stores partial image information included in the area of a part and a part name in the intermediate data in an associated manner. For example, a part name is text information stored in the attribute information area of PostScript data corresponding to the part. For example, partial image information included in an area of a part corresponds to a state information.

The second acquiring unit 152 generates plural pieces of the intermediate data by repeatedly performing the processing described above each time captured image data is stored in the image buffer 141. The second acquiring unit 152 stores a time, identification information, direction information of intermediate data, attribute information, and image information in the intermediate-data accumulation table 143 in an associated manner.

The determining unit 153 performs determination about a movement of a subject based on the direction information of the respective intermediate data accumulated in the intermediate-data accumulation table 143 and the action determination table 144. Moreover, the determining unit 153 performs determination about a state (event) of a part of the subject based on the respective intermediate data accumulated in the intermediate-data accumulation table 143 and the event determination table 145. The determining unit 153 outputs a determination result to the generating unit 154.

Processing of determining about a movement of a subject performed by the determining unit 153 will be explained. The determining unit 153 acquires respective direction information of a period from a reference time until a time after predetermined time from the intermediate-data accumulation table 143. The reference time may be a time specified in advance, or a time that is predetermined time prior to a current time.

The determining unit 153 sorts the acquired pieces of the direction information in chronological order, and compares a transition of angle indicated by the respective pieces of the direction information with the respective angle transition patterns of the action determination table 144, to determine a corresponding angle transition pattern. The determining unit 153 determines an action type corresponding to the determined angle transition pattern. The determining unit 153 outputs the determined action type to the generating unit 154.

Processing of determining a state (event) of a part of a subject performed by the determining unit 153 will be explained. The determining unit 153 acquires respective pieces of image information (partial image information of each part) in a period from a reference time until a time after predetermined time, from the intermediate-data accumulation table 143. The acquired partial image information is associated with a part name.

The determining unit 153 categorizes the partial image information per part name, and sorts the categorized image information in chronological order. The determining unit 153 compares the respective pieces of image information sorted in chronological order per part name with the event determination table 145 illustrated in FIG. 9, to identify a hit event.

For example, the determining unit 153 refers to the respective pieces of the image information corresponding to the part name "head lamp", and determines that the event is "lamp is turned on" when the brightness of the respective pieces of the image information aligned in chronological order is continuously being equal to or higher than a threshold for a predetermined period of time. The determining unit 153 refers to the respective pieces of image information corresponding to the part name "head lamp", and determines that the event is "lamp is turned off" when the brightness of the respective pieces of the image information aligned in chronological order is continuously being lower than the threshold for a predetermined period of time.

The determining unit 153 refers to the respective pieces of the image information corresponding to the part name "right direction indicator", and determines that the event is "right direction indicator is turned on" when the brightness of the respective pieces of the image information aligned in chronological order is repeatedly being equal to or higher than a threshold and lower than the threshold every predetermined period. The determining unit 153 refers to the respective pieces of the image information corresponding to the part name "left direction indicator", and determines that the event is "left direction indicator is turned on" when the brightness of the respective pieces of the image information aligned in chronological order is repeatedly being equal to or higher than a threshold and lower than the threshold every predetermined period.

The determining unit 153 refers to the respective pieces of the image information corresponding to the part name "stop lamp", and determines that the event is "brake" when the brightness of the respective pieces of the image information aligned in chronological order is equal to or higher than a threshold.

Moreover, the determining unit 153 may refer to the image information corresponding to the text information of the PostScript data of the highest layer (for example, sports car), and may determine a color corresponding to the part name "sports car". In the following explanation, the color determined from image information corresponding to text information of PostScript data of the highest layer (for example, sports car) is denoted as "subject color information". Moreover, text information of PostScript data of the highest layer (for example, sports car) is denoted as "subject name".

The determining unit 153 outputs the subject name, the subject color information, the action type, and information of event to the generating unit 154 as a determination result.

The generating unit 154 is a processing unit that generates the sentence information based on the determination result of the determining unit 153 and the sentence template 146. The generating unit 154 stores the generated sentence information in the sentence accumulation table 147.

Figure 10:
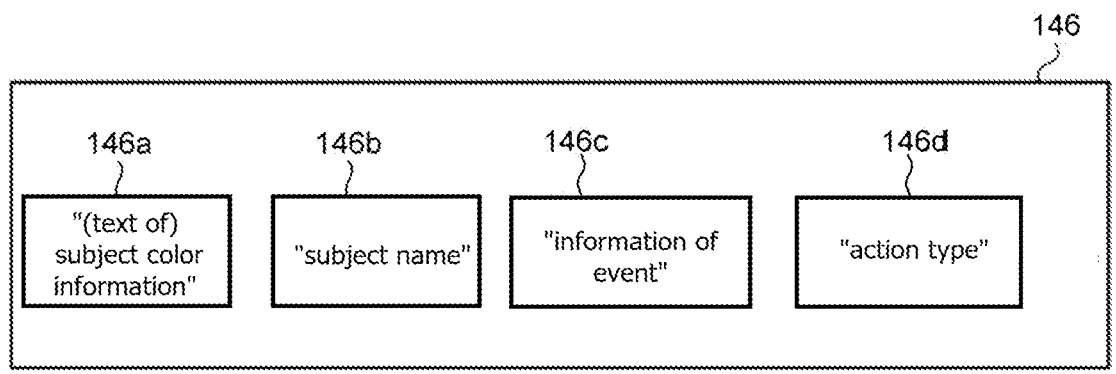
FIG. 10 is a diagram illustrating an example of a sentence template according to the present embodiment.

FIG. 10 is a diagram illustrating an example of the sentence template according to the present embodiment. For example, the sentence template 146 includes plural areas 146a, 146b, 146c, 146d, and text information connecting the respective areas. The area 146a is an area in which the "(text of) subject color information" is set. The area 146b is an area in which the "subject name" is set. The area 146c is an area in which the "information of event (test)" is set. The area 146d is an area in which the "action type" is set.

For example, suppose that the subject color information is "red", the subject name is "sports car", the information of event is "right direction indicator is flashing", and the action type is "right turn". In this case, the generating unit 154 generates sentence information "a red sports car turned right while flashing the right direction indicator".

The display control unit 155 acquires captured image data from the image buffer 141, and generates superimposed image data in which the sentence information accumulated in the sentence accumulation table 147 is superimposed on the acquired captured image data. The display control unit 155 outputs the superimposed image data to the display unit 130 to be displayed thereon. The display control unit 155 superimposes the sentence information at a position of one part of the subject when generating the superimposed image data. The display control unit 155 determines a position of the part of the subject based on the relevant PostScript data.

Figure 11:
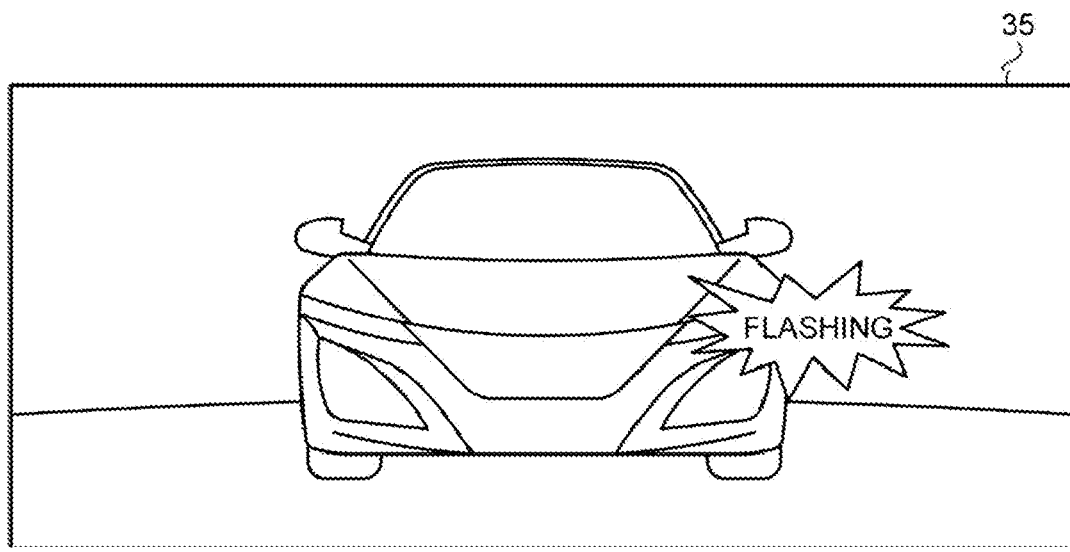
FIG. 11 is a diagram illustrating an example of superimposed image data.

The display control unit 155 may cut out a part of the sentence information, to generate the superimposed image data. FIG. 11 is a diagram illustrating an example of the superimposed image data. In the example illustrated in FIG. 11, text information "flashing" is superimposed at a position of a left direction indicator of the subject in superimposed image data 35.

Figure 12:
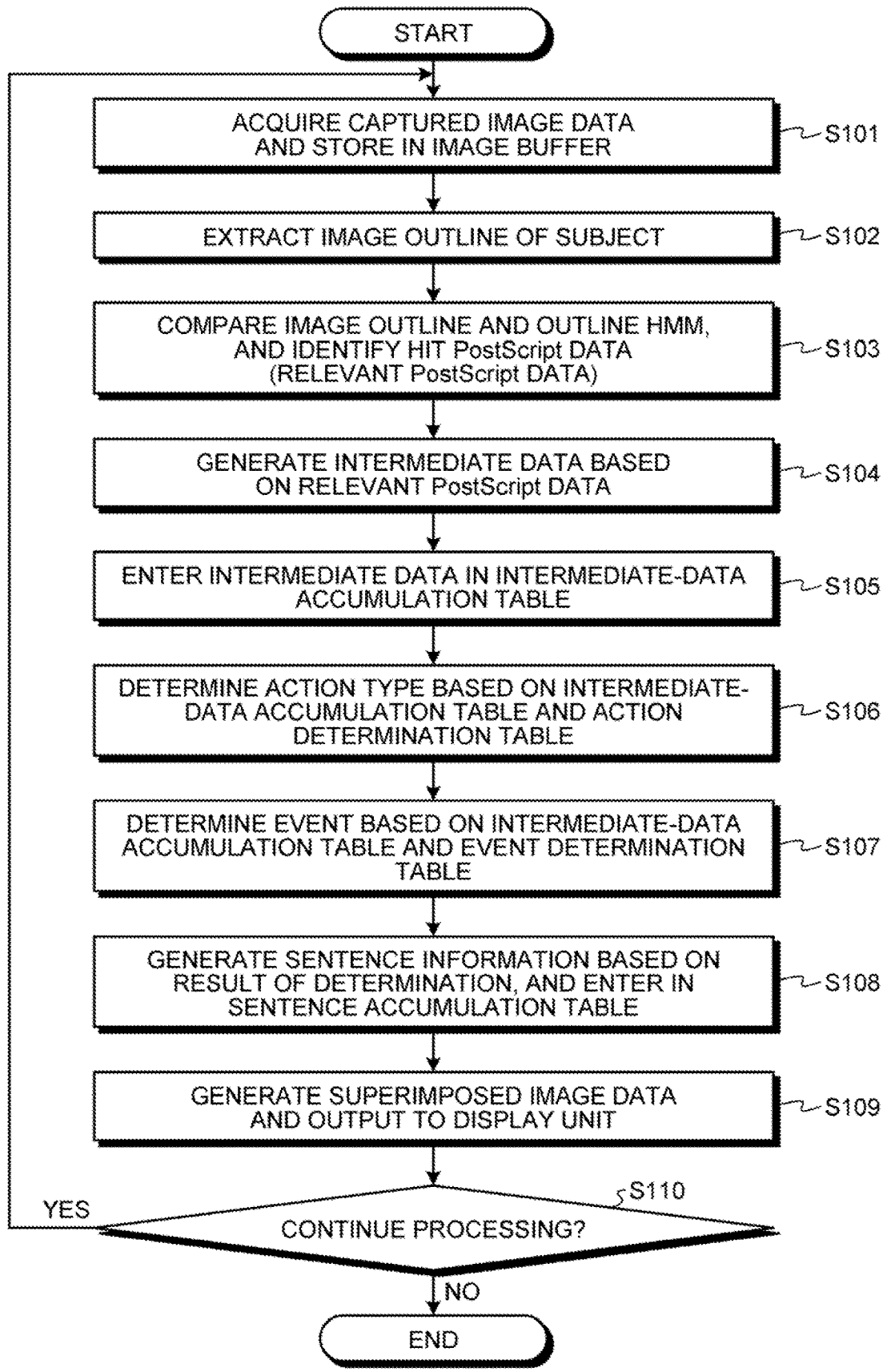
FIG. 12 is a flowchart illustrating a processing procedure of the information processing apparatus according to the present embodiment.

Next, an example of a processing procedure of the information processing apparatus according to the present embodiment will be explained. FIG. 12 is a flowchart illustrating a processing procedure of the information processing apparatus according to the present embodiment. As illustrated in FIG. 12, the first acquiring unit 151 of the information processing apparatus 100 acquires captured image data from the camera 105, and stores it in the image buffer 141 (step S101).

The second acquiring unit 152 of the information processing apparatus 100 extracts an image outline (outline) of a subject (step S102). The second acquiring unit 152 compares the image outline and the outline HMM, to identify hit PostScript data (relevant PostScript data) (step S103).

The second acquiring unit 152 generates intermediate data based on the relevant PostScript data (step S104). The second acquiring unit 152 enters the intermediate data in the intermediate-data accumulation table 143 (step S105).

The determining unit 153 of the information processing apparatus 100 determines an action type based on the intermediate-data accumulation table 143 and the action determination table 144 (step S106). The determining unit 153 determines an event based on the intermediate-data accumulation table 143 and the event determination table 145 (step S107).

The generating unit 154 of the information processing apparatus 100 generates sentence information based on a determination result of the determining unit, and enters it in the sentence accumulation table 147 (step S108). The display control unit 155 of the information processing apparatus 100 generates superimposed image data in which the sentence information and the captured image data are superimposed on each other, and outputs it to the display unit 130 (step S109).

The information processing apparatus 100 shifts to step S101 when the processing is continued (step S110: YES). The information processing apparatus 100 ends the processing when the processing is not continued (step S110: NO).

Next, an effect of the information processing apparatus 100 according to the present embodiment will be explained. The information processing apparatus 100 repeats the processing of identifying direction information of a subject by extracting an outline of a subject from captured image data, and comparing the extracted outline and the outline HMM 142, and performs determination about a movement of the subject based on a relationship among the respective direction information. Thus, the information processing apparatus 100 performs determination about a movement based on direction information identified from respective outlines and, therefore, can reduce determination time for a movement of a subject.

The information processing apparatus 100 generates sentence information based on text information in the respective attribute information areas provided in the relevant PostScript data. Therefore, sentence information explaining a subject can be easily generated.

The information processing apparatus 100 identifies a position of each part of a subject in captured image data from a result obtained by comparing an outline of the subject and the outline HMM 142. The information processing apparatus 100 determines an event based on a pattern of image information corresponding to a position of each part. Thus, determination about a state of one part of the subject can be performed easily.

The information processing apparatus 100 superimposes sentence information at a position corresponding to a part of a subject in captured image data, to generate superimposed image data, and outputs it to the display unit 130 to be displayed thereon. Thus, a state of a part of the subject can be notified to a user in an easy-to-follow way.

Figure 13:
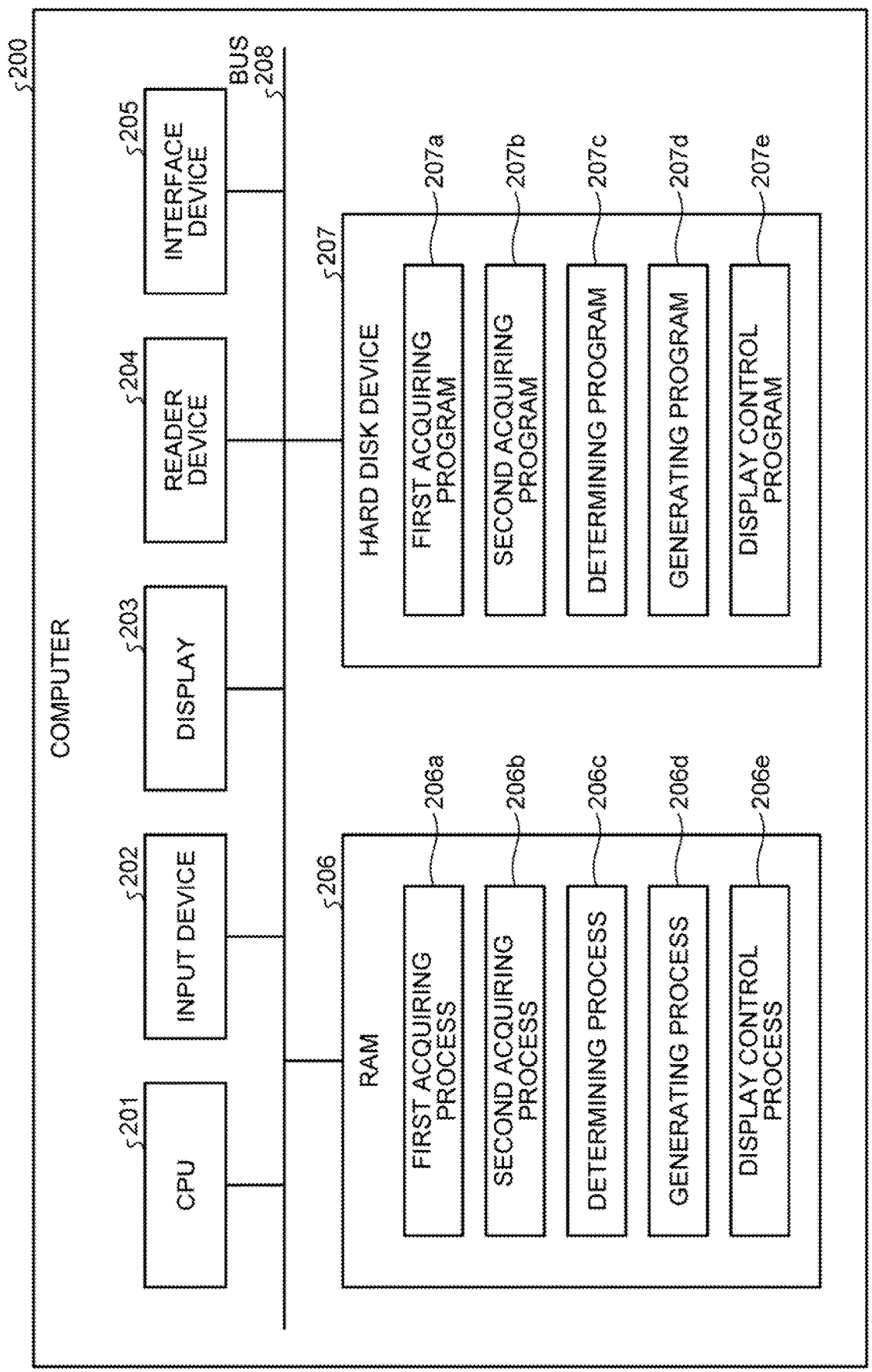
FIG. 13 is a diagram illustrating an example of a hardware configuration of a computer that implements functions similar to those of the information processing apparatus.

Next, an example of a hardware configuration of a computer that implements functions similar to those of the information processing apparatus 100 described in the above embodiment will be explained. FIG. 13 is a diagram illustrating an example of a hardware configuration of the computer that implements functions similar to those of the information processing apparatus.

As illustrated in FIG. 13, a computer 200 includes a CPU 201 that performs various kinds of arithmetic processing, an input device 202 that accepts an input of data from a user, and a display 203. Moreover, the computer 200 includes a reader device 204 that reads a program and the like from a storage medium, and an interface device 205 that performs communication of data with an external device, the camera 105, and the like through a wired or wireless network. The computer 200 includes a RAM 206 that temporarily stores various kinds of information, and a hard disk device 207. The respective devices 201 to 207 are connected to a bus 208.

The hard disk device 207 has a first acquiring program 207a, a second acquiring program 207b, a determining program 207c, a generating program 207d, and a display control program 207e. The CPU 201 reads the first acquiring program 207a, the second acquiring program 207b, the determining program 207c, the generating program 207d, and the display control program 207e, and loads on the RAM 206.

The first acquiring program 207a functions as a first acquiring process 206a. The second acquiring program 207b functions as a second acquiring process 206b. The determining program 207c functions as a determining process 206c. The generating program 207d functions as a generating process 206d. The display control program 207e functions as a display control process 206e.

Processing of the first acquiring process 206a corresponds to the processing of the first acquiring unit 151. Processing of the second acquiring process 206b corresponds to the second acquiring unit 152. Processing of the determining process 206c corresponds to the processing of the determining unit 153. Processing of the generating process 206d corresponds to the processing of the generating unit 154. Processing of the display control process 206e corresponds to the processing of the display control unit 155.

The respective programs 207a to 207e are not necessarily stored in the hard disk device 207 from the beginning. For example, the respective programs are stored in a "portable physical medium", such as a flexible disk (FD), a CD-ROM, a DVD disk, a magneto-optical disk, and an IC card, inserted to the computer 200. It may be configured such that the computer 200 reads and executes the respective programs 207a to 207e therefrom.

Determination time for a movement of a subject or a state of one part of the subject included in a captured image can be reduced.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determining method comprising:
   acquiring first direction information of an identified subject based on a position of relevant PostScript data of the subject, when a first captured image captured by an imaging device is acquired, by referring to a storage storing a plurality of pieces of direction information indicating a plurality of directions associating with respective shapes of a plurality of contours of an object according to a plurality of directions of the object, the first direction information associated with a shape of a contour that corresponds to a shape of a contour of the subject included in the acquired first captured image among the shapes of the contours, the relevant PostScript data being PostScript data that is used to draw an outline with which the similarity to the image outline is maximized;
   acquiring second direction information of the identified subject based on the position of relevant PostScript data of the subject, when a second captured image newly captured by the imaging device is acquired, by referring to the storage to acquire second direction information associated with a shape of a contour that corresponds to a contour of the subject included in acquired second captured image among the shapes of contours; and
   performing determination about a movement of the subject based on a relationship between the acquired first direction information and second direction information, by a processor.

2. The determining method according to claim 1, wherein the storage associates the direction information and text information, respectively, and
   the determining method further includes acquiring first text information corresponding to the first direction information and second text information corresponding to the second direction information from the storage, and generating text information indicating a movement of the subject based on the acquired first text information and second text information.

3. The determining method according to claim 2, further including outputting information of the subject and the text information indicating a movement of the subject in an associated manner.

4. A determining method comprising:
   acquiring a plurality of captured images captured by an imaging device;
   generating contour data indicating a shape of a contour of one part of a subject included in the captured images and state information about a state of the one part based on the acquired captured images;
   acquiring attribute information, by referring to a storage that stores attribute information of a plurality of parts of an object associating with a plurality of pieces of contour data indicating shapes of contour of the respective parts, the attribute information associated with the contour data when contour data corresponding to the generated contour data is included in the plurality of pieces of the contour data; and
   performing determination about an event of the one part of the subject based on the generated state information and the acquired attribute information, the event indicating pattern of change of the image information in a certain period, by a processor.

5. The determining method according to claim 4, wherein the attribute information includes text information indicating a part of the subject, and
   the determining method further includes generating text information indicating a state of one part of the subject based on the text information and a determination result from the performing the determination.

6. The determining method according to claim 4, further including generating a superimposed image in which text information indicating a state of the one part of the subject is superimposed on at least one captured image out of the captured images, and displaying the superimposed image.

7. The determining method according to claim 6, wherein the generating the superimposed image includes generating a superimposed image by superimposing the text information at a position corresponding to the one part included in the one captured image.

8. An information processing apparatus comprising:
   a processor configured to:
      refer, when a first captured image captured by an imaging device is acquired, to a storage storing a plurality of pieces of direction information indicating a plurality of directions, associating with respective shapes of a plurality of contours of an object according to a plurality of directions of the object, to acquire first direction information of an identified subject based on a position of relevant PostScript data of the subject associated with a shape of a contour that corresponds to a shape of a contour of the subject included in the acquired first captured image among the shapes of the contours and refer, when a second captured image newly captured by the imaging device is acquired, to the storage to acquire second direction information of the identified subject based on the position of relevant PostScript data of the subject associated with a shape of a contour that corresponds to a contour of the subject included in acquired second captured image among the shapes of contours, the relevant PostScript data being PostScript data that is used to draw an outline with which the similarity to the image outline is maximized; and
      perform determination about a movement of the subject based on the acquired first direction information and second direction information.

9. The information processing apparatus according to claim 8, wherein the processor is further configured to:

associate the direction information and text information, respectively, and acquire first text information corresponding to the first direction information and second text information corresponding to the second direction information from the storage, and generate text information indicating a movement of the subject based on the acquired first text information and second text information.

10. The information processing apparatus according to claim 9, wherein the processor is further configured to output information of the subject and the text information indicating a movement of the subject in an associated manner.

11. An information processing apparatus comprising:

a processor configured to:

acquire a plurality of captured images captured by an imaging device;

generate contour data indicating a shape of a contour of one part of a subject included in the captured images and state information about a state of the one part based on the acquired captured images, refer to a storage that stores attribute information of a plurality of parts of an object associating with a plurality of pieces of contour data indicating shapes of contour of the respective parts, and acquire, when contour data corresponding to the generated contour data is included in the plurality of pieces of the contour data, attribute information associated with the contour data; and perform determination about a state an event of the one part of the subject based on the generated state information and the acquired attribute information, the event indicating pattern of change of the image information in a certain period.

12. The information processing apparatus according to claim 11, wherein the attribute information includes text information indicating a part of the subject, and the processor is further configured to generate text information indicating a state of one part of the subject based on the text information and a determination result from the performing the determination.

13. The information processing apparatus according to claim 12, wherein the processor is further configured to generate a superimposed image in which text information indicating a state of the one part of the subject is superimposed on at least one captured image out of the captured images, and display the superimposed image.

14. The information processing apparatus according to claim 13, wherein the processor is further configured to generate a superimposed image by superimposing the text information at a position corresponding to the one part included in the one captured image.

* * * * *